July 18, 1961
H. E. BOWERMAN
2,992,658
EXPANSIBLE CHAMBER ACTUATOR STRUCTURE
Filed Aug. 5, 1960
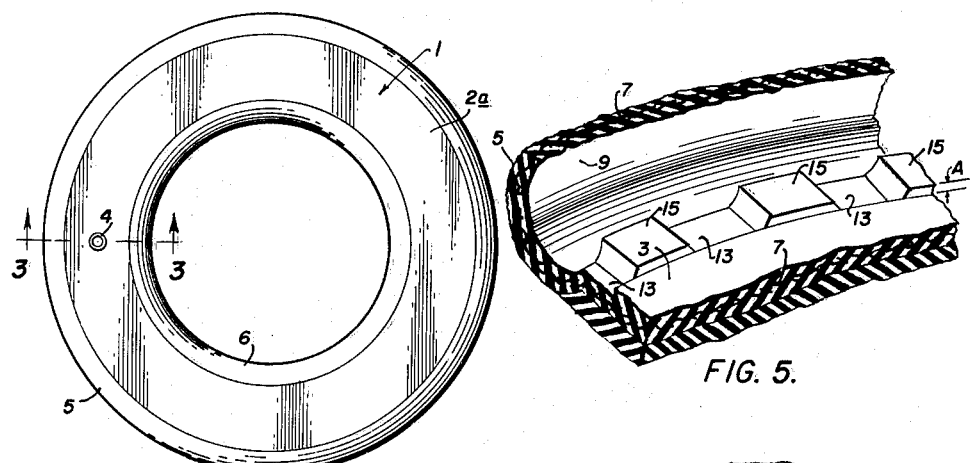
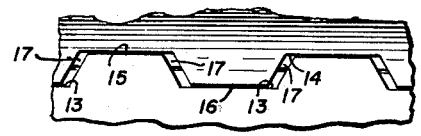
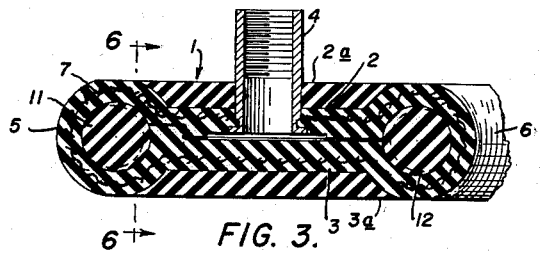
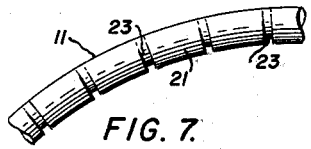
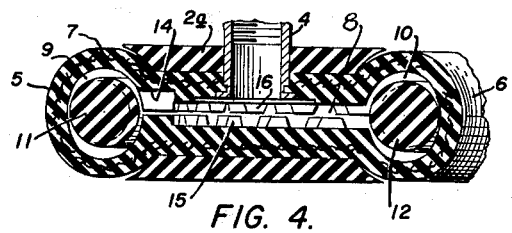
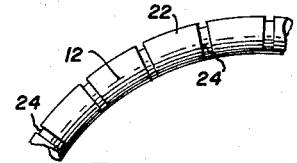
HULIE E. BOWERMAN
INVENTOR.
BY *Ge W Waldrof*
ATTORNEY

2,992,658
EXPANSIBLE CHAMBER ACTUATOR STRUCTURE
Hulie E. Bowerman, 904 Meadow Oaks, Arlington, Tex.
Filed Aug. 5, 1960, Ser. No. 47,742
9 Claims. (Cl. 137—784)

This invention relates to expansible fluid actuators comprising substantially toroidal rubber tubes for use in fluid actuated clutch and drive assemblies of the ring or disc type, and more particularly this invention relates to improvements in the structure of such actuators for the purpose of venting the fluid more quickly and more definitely from within the actuator during deflation thereof.

For the sake of brevity, this application will refer hereinafter to clutch actuators, although it is to be clearly understood that the invention applies equally to brake actuators.

The trend in such actuators at the present time is toward low internal volume structure wherein the amount of air, or other actuating fluid, in the cavity within the tube is kept to a minimum, and preferably wherein the volume of the internal cavity goes almost to zero when the tube is deflated, this type of structure not only using less air to actuate it on each stroke but also having more positive action than is obtained when using a tube in which there is a large residual fluid volume at all times which serves as a cushion to prevent quick actuation of the tube. This type of tube can be characterized as a low-volume quick-acting actuator.

In order to accomplish the object of reducing the fluid volume to a minimum, the central cavity of the tube which is located between the two larger parallel walls of the toroid, hereinafter referred to as the actuator walls of the tube, is reduced substantially to zero by having the actuator walls come substantially together when the tube is deflated. However, since the actuator walls should move in and out substantially parallel to each other over a sizeable stroke displacement, it is necessary to provide enlarged inner and outer end cavities defined by the inner and outer substantially circular flex walls. The prior art teaches the insertion of rubber O-rings into these inner and outer circular end cavities for the sake of reducing the fluid volume therein substantially to zero, these O-rings being a snug fit in the associated end cavities when the tube is fully deflated.

However, considerable difficulty has been experienced in this latter type of low-volume clutch tube because of the fact that the O-rings serving to fill the circular end cavities adjacent the flex zones of the tube tend to become displaced into the central cavity when the tube is wholly inflated and stop up the passageway between the central cavity and the end cavity and thereby entrap the fluid medium between the O-ring and the associated circular end wall and thus prevent deflation of the tube. In other words, upon introduction of the fluid into the tube through one or more spud means passing through an actuator wall in the central cavity of the tube, this medium enters the space around the O-rings as the tube expands toward its full stroke, but upon release of the fluid pressure, and especially where such release takes place suddenly, as is the case when rapidly stroking the tube, pockets of fluid become entrapped by the O-rings in the flex zones of the tube whereupon the ability of the tube to fully collapse is temporarily destroyed. This effect tends to occur more in the vicinity of the outer O-ring which is urged inwardly by the fluid toward the central cavity and the distortion of the O-ring in this manner plugs up the fluid passage into the central cavity from the associated end cavity. Obviously, it can be very serious to have a clutch suddenly become fluid-locked in its extended position so that it cannot be collapsed. Moreover, the high-speed stroking of the tube is especially important in many applications for which the tubes are presently used, for instance in connection with the intermittent operation of high-speed parts-stamping machines in sheet metal factories.

It is the principal object of this invention to provide a fluid actuator structure including pressure relief ducts or channels in one or both of the adjacent surfaces of the O-rings and circular end walls so that these relief channels which are disposed in a plurality of radial planes each including the axis of the toroid can quickly bypass pockets of fluid from behind the O-rings into the central cavity of the tube and thence out through the spud means. Experiment has indicated that these relief channels are most useful in the circular end surfaces at the outer flex zone, although the channels are also useful in the surface at the inner flex zone. A plurality of actuators have been made in accordance with this disclosure, and are providing excellent trouble-free service.

It is another very important object of this invention to provide abutment means uniformly spaced around the junction of the central cavity with the end cavities, the abutment means extending beyond the mutually adjacent surfaces of each of the actuator walls in the direction of the opposite actuator wall and mutually intermeshing in a tooth-like manner. These abutments serve to prevent entry of an O-ring into the central cavity of the tube from an adjacent circular end cavity. In other words, it is possible for the O-ring to cause trouble in two different ways. In the first described way, an O-ring can choke the passage of fluid from a circular end cavity into the central cavity, or vice versa; and in the second way, the O-ring can itself be displaced in the central cavity so as to mechanically prevent collapse of the tube to its smallest volume by its physical presence. The present structure positively retains the O-ring in the associated circular end cavity, while at the same time assuring the venting of the fluid behind the O-ring during collapse of the tube.

Other objects and advantages of my invention will become apparent during the following discussion of the drawing, wherein:

FIG. 1 is a plan view showing an inflatable actuator according to the present invention;

FIG. 2 is an elevational view of the actuator of FIG. 1, but showing part of the tube broken away so as to present a cross-sectional view;

FIG. 3 is an enlarged cross-sectional view taken along line 3—3 of FIG. 1;

FIG. 4 is a cross-sectional view similar to FIG. 3 but showing the tube partially inflated;

FIG. 5 is a further-enlarged fragmentary perspective view showing the internal structure of the tube illustrated in FIG. 4;

FIG. 6 is an enlarged fragmentary sectional view taken along line 6—6 of FIG. 3;

FIG. 7 is a perspective view showing a modified form of O-ring which can be used according to the present invention in the outermost circular end cavity;

FIG. 8 is a perspective view similar to FIG. 7 but showing a modified O-ring which can be used in the innermost circular end cavity; and FIG. 9 is a perspective view partly in section showing a still further modified form of O-ring suitable for use in either the inner or outer circular end cavity of the tube.

Referring now to the drawing, the tube 1 is in the form of a modified toroidal resilient structure comprising a pair of opposed actuator walls 2 and 3, the wall 2 having at least one spud 4 passing therethrough for the purpose of introducing the actuating fluid into the tube or evacuating the fluid therefrom. The actuator tube 1 further includes a pair of flexing end walls 5 and 6, and for the sake of preventing radial slumping of the tube during rapid rotation thereof, the walls 2, 3, 5 and 6 are preferably provided with an embedded strengthening fabric or cord generally referred to by the reference character 7.

The opposed actuator walls 2 and 3 are very close together when the tube is deflated, as shown in FIG. 3, so that the central cavity 8 located between the opposed actuator walls 2 and 3 has substantially zero volume when the tube is deflated. The actuator walls are further provided with fillers 2a and 3a which fill out the outer contours of the actuator walls at least even with the outer peripheries of the circular flex walls 5 and 6. However, the flexing walls 5 and 6 are made substantially circular and are of large enough diameter so that they leave relatively large end cavities including an outer end cavity 9 and an inner end cavity 10 as best illustrated in FIG. 4. The actuating fluid therefore enters and leaves by way of the spud 4 which communicates directly into the central cavity 8 and is then distributed from the central cavity 8 to the outer and inner end cavities 9 and 10, respectively.

As set forth in the objects of the invention, in order to reduce the inner volume of the cavities as close to zero as possible, outer and inner O-rings 11 and 12 respectively are introduced into the end cavities 9 and 10, and these O-rings completely fill the cavities when the tube is deflated as shown in FIG. 3. However, as pointed out in the objects of this invention, it frequently occurs that the O-rings tend to enter the central cavity during deflation of the tube and therefore prevent such deflation either by their presence in the central cavity or by entrapping fluid in the circular end cavity, or both. The embodiment of the invention shown in FIGS. 3, 4, 5 and 6 is intended to eliminate both of these difficulties by providing relief channels or ducts 13, 14 in the two opposed walls of the tube adjacent the junction of the central cavity with one or both of the circular end cavities. Merely providing the recessed channels or ducts at the junction of the central cavity with each end cavity would solve the problem of admitting or evacuating fluid from the circular end cavities, but such channels or ducts will not prevent the entry of an O-ring into the central cavity from its associated end cavity and may even facilitate such entry. Therefore, the applicant also provides intermeshing tooth-shaped abutments 15 in the channel 13, and 16 in the channel 14. The abutments 15 and 16 do not actually mesh with each other in the sense that they are in continuous contact, but rather, air spaces 17 are provided between the edges of the abutments so as to provide at all times a clear passage for the actuating fluid between the central cavity 8 and the adjacent circular end cavities 9 or 10, as the case may be. It is also to be noted, that the abutments 15 and 16 extend beyond the inner surfaces of the actuator walls 2 and 3 in the manner illustrated in FIG. 5. For instance, the tooth 15 in FIG. 5 extends above the surface 3 by a distance labeled A and as can also be seen in FIG. 4. The abutments 16 extend generally below the inner surface of the actuator wall 2 by a similar distance. In this manner, unobstructed flow of fluid is permitted between the central cavity 8 and each of the circular end cavities 9 and 10, but the tooth-shaped abutments prevent entry of an O-ring 11 or 12 into the central cavity.

As viewed in broad terms, the invention is primarily directed toward the prevention of fluid entrapment in the circular end cavity behind an O-ring. In order to accomplish this purpose it is not necessary that the fluid ducts or channels be located in the actuator walls or in the circular end walls, but the purpose is also served when the channels or ducts are made in the O-rings themselves. For instance, FIG. 7 shows an outer O-ring 21 corresponding with the O-ring 11 in FIGS. 3 and 4, and FIG. 8 shows an inner O-ring 22 corresponding with the inner O-ring 12 shown in FIGS. 2 and 4. The O-rings shown in FIGS. 7 and 8 are mutually oriented in substantially the same relative positions as they would occupy within a portion of an actuator. Note that both O-rings shown in FIGS. 7 and 8 are provided with fluid relief ducts or channels which are provided with the reference character 23 in FIG. 7 and 24 in FIG. 8, and it is further to be noted that the relief ducts or channels 23 in the outer O-ring are deepest on the inner surface thereof and taper to zero depth at the outer surface. Likewise, in FIG. 8, the relief channels 24 are deepest at the outer surface of the O-ring 22 and taper substantially to zero depth at the inner surface of the O-ring 22. In this manner, a structure is provided which will not entrap air behind the O-ring in the respective circular cavities which they are to occupy.

FIG. 9 shows still another modified form of O-ring suitable for use either in the inner or outer circular cavity, this O-ring 25 illustrated in FIG. 9 having a plurality of radially disposed ducts or fluid relief channels 26 disposed through the O-ring at regular intervals. These ducts or channels 26 are provided through the O-ring 25 so as to vent any fluid trapped behind the O-ring 25 in a circular end cavity into the central cavity of the tube.

This invention is not to be limited to the precise forms shown in the drawing, for obviously changes may be made therein within the scope of the following claims.

I claim:
1. An inflatable actuator comprising a modified toroidal resilient tube having an axis and having a pair of parallel mutually opposed actuator walls joined by a pair of mutually opposed flexing walls, the pairs of walls enclosing a fluid receiving cavity including a central cavity between the actuator walls and including substantially circular cavities each of cross-sectional diameter greater than the height of the central cavity as measured between said actuator walls, fluid conducting spud means extending through at least one actuator wall into said central cavity; and an O-ring in each of said end cavities and of such diameter that the circular interior surface of each end cavity snugly fits the circular exterior surface of the associated O-ring when the tube is deflated, and at least one of said circular surfaces having fluid-relief ducts therein and communicating with the central cavity, each relief duct lying in a substantially radial plane including said axis and relieving fluid entrapped in the end cavity by the O-ring.

2. In an actuator as set forth in claim 1, said fluid-relief ducts comprising a series of channels recessed into the actuator walls and the flexing walls of an adjacent end cavity in the vicinity of the junction of the end cavity with the central cavity.

3. In an actuator as set forth in claim 1, said fluid relief ducts comprising a series of channels recessed into the actuator walls and the flexing walls of an adjacent end cavity in the vicinity of the junction of the end cavity with the central cavity; and intermeshing rows of abutments alternately interlaced with the channels and each abutment on one side of the cavity bottoming in a channel on the other side of the cavity when the tube is deflated.

4. In an actuator as set forth in claim 1, said fluid-relief ducts comprising channels recessed into the surfaces of the O-rings, each channel being deepest at the surface of the ring nearest the central cavity and tapering substantially to zero depth on the opposite surface of the O-ring.

5. In an actuator as set forth in claim 1, each fluid-relief duct extending through an O-ring from the surface nearest the central cavity to the surface there opposite.

6. An inflatable actuator comprising a modified toroidal resilient tube having an axis and having a pair of parallel mutually opposed actuator walls joined by a pair of mutually opposed flexing walls, the pairs of walls enclosing a fluid receiving cavity including a central cavity between the actuator walls and including substantially circular end cavities each of cross-sectional diameter greater than the height of the central cavity as measured between said actuator walls, fluid conducting spud means extending through at least one actuator wall into said central cavity; and an O-ring in each of said end cavities and of such diameter that the circular interior surface of each end cavity snugly fits the circular exterior surface of the associated O-ring when the tube is deflated, and at least one of said circular surfaces having fluid-relief channels recessed thereinto at least partway therearound and communicating with the central cavity, said relief channels relieving fluid entrapped in the end cavity by an O-ring.

7. In an actuator as set forth in claim 6, said fluid-relief ducts comprising a series of channels recessed into the actuator walls and the flexing walls of an adjacent end cavity in the vicinity of the junction of the end cavity with the central cavity; and intermeshing rows of abutments alternately interlaced with the channels and each abutment on one side of the cavity bottoming in a channel on the other side of the cavity when the tube is deflated.

8. In an actuator as set forth in claim 6, said fluid-relief ducts comprising channels recessed into the surfaces of the O-rings, each channel being deepest at the surface of the ring nearest the central cavity and tapering substantially to zero depth on the opposite surface of the O-ring.

9. In an actuator as set forth in claim 6, said fluid-relief channels comprising channels recessed into the surfaces of an O-ring.

No references cited.